(12) United States Patent
Gal et al.

(10) Patent No.: US 11,706,042 B2
(45) Date of Patent: Jul. 18, 2023

(54) SPATIAL CHAT VIEW DASHBOARD

(71) Applicant: Zoom Video Communications, Inc., San Jose, CA (US)

(72) Inventors: Oded Gal, Palo Alto, CA (US); Andrew Law, Los Gatos, CA (US); Sally Lu, Los Angeles, CA (US); Ping Luo, Pleasanton, CA (US); Sharvari Nerurkar, Redmond, WA (US); Archil Vardidze, Austin, TX (US); Zheng Yuan, Santa Clara, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/472,665

(22) Filed: Sep. 12, 2021

(65) Prior Publication Data
US 2023/0085567 A1    Mar. 16, 2023

(51) Int. Cl.
*H04L 12/18*    (2006.01)

(52) U.S. Cl.
CPC ................ *H04L 12/1813* (2013.01)

(58) Field of Classification Search
CPC ............. G06F 3/0482; G06F 3/04842; H04L 12/1813; H04L 12/1822
See application file for complete search history.

(56) References Cited

U.S. PATENT DOCUMENTS

| | | | |
|---|---|---|---|
| 10,331,303 B1* | 6/2019 | Gurtin | G06F 3/0482 |
| 11,488,263 B1* | 11/2022 | Chugh | G06Q 50/01 |
| 2014/0006977 A1* | 1/2014 | Adams | H04L 12/1818 715/753 |
| 2019/0182299 A1* | 6/2019 | O'Brien | H04L 65/4015 |
| 2021/0044559 A1* | 2/2021 | Jain | H04L 51/216 |
| 2022/0321370 A1* | 10/2022 | Skuratowicz | H04L 12/1827 |
| 2022/0321374 A1* | 10/2022 | Lin | H04L 12/1822 |

OTHER PUBLICATIONS

Duc Anh Le et al., Enhancing the Experience of Virtual Conferences in Social Virtual Environments, Mar. 1, 2020, IEEE Xplore, pp. 485-494 (Year: 2020).*
Pierrick Jouet et al., AR-Chat: AR-based instant messaging system, Nov. 1, 2020, IEEE Xplore, pp. 153-157 (Year: 2020).*

* cited by examiner

*Primary Examiner* — Tam T Tran
(74) *Attorney, Agent, or Firm* — Kilpatrick Townsend & Stockton LLP

(57) ABSTRACT

Methods and systems provide for a spatial chat view dashboard within a messaging platform. A system displays, at a client device, a dashboard user interface for a messaging platform, consisting of at least a dashboard virtual background and one or more spatial chat rooms. Each of the spatial chat rooms is a spatial representation of a chat session associated with a number of participants. The system receives, from the client device, a selection of a spatial chat room from the one or more spatial chat rooms. The system then displays a spatial chat user interface comprising the selected spatial chat room.

19 Claims, 14 Drawing Sheets

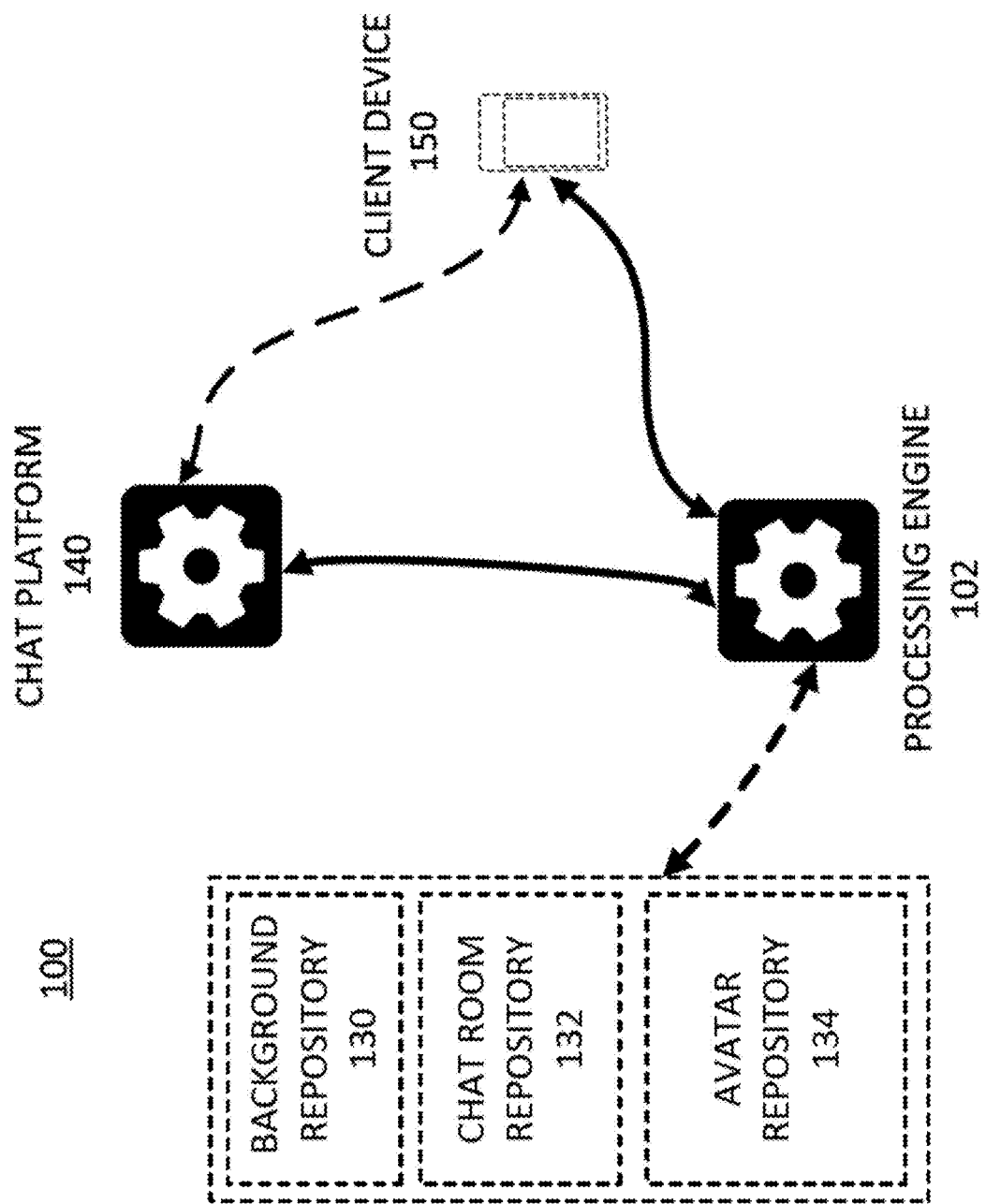

SPATIAL CHAT VIEW DASHBOARD

FIELD OF INVENTION

The present invention relates generally to digital communication, and more particularly, to systems and methods for providing a spatial chat view dashboard within a messaging platform.

BACKGROUND

Digital communication tools and platforms have been essential in providing the ability for people and organizations to communicate and collaborate remotely, e.g., over the internet. In particular, there has been massive adopted use of chat platforms allowing for remote communication sessions between multiple participants. One such modality for this remote communication may be colloquially referred to as a "chat" or "messaging" session, facilitated by a chat or messaging platform (hereinafter referred to as "chat" and "chat platform", respectively). A chat platform is a tool configured to enabled internet users to remotely exchange messages. Such messages may be sent within, e.g., a chat room, a persistent chat channel, in a one-on-one conversation, or in some other configuration.

Chat interfaces within such platforms have generally laid out messages in a visually linear fashion, from top to bottom. For example, a first message from Participant 1 appears, then below it, a second message from Participant 2. A third message then appears from Participant 1, replying to Participant 2, and so on. A small avatar, such as a rounded image of the participant or simply a letter representing the participant's name, may appear next to the messages indicating whether Participant 1 or Participant 2 has sent a particular message.

BRIEF DESCRIPTION OF THE DRAWINGS

The present invention relates generally to digital communication, and more particularly, to systems and methods providing for dynamic alteration of notification preferences within a chat platform.

The present disclosure will become better understood from the detailed description and the drawings, wherein:

FIG. 1A is a diagram illustrating an exemplary environment in which some embodiments may operate.

DETAILED DESCRIPTION

Figure 1B:
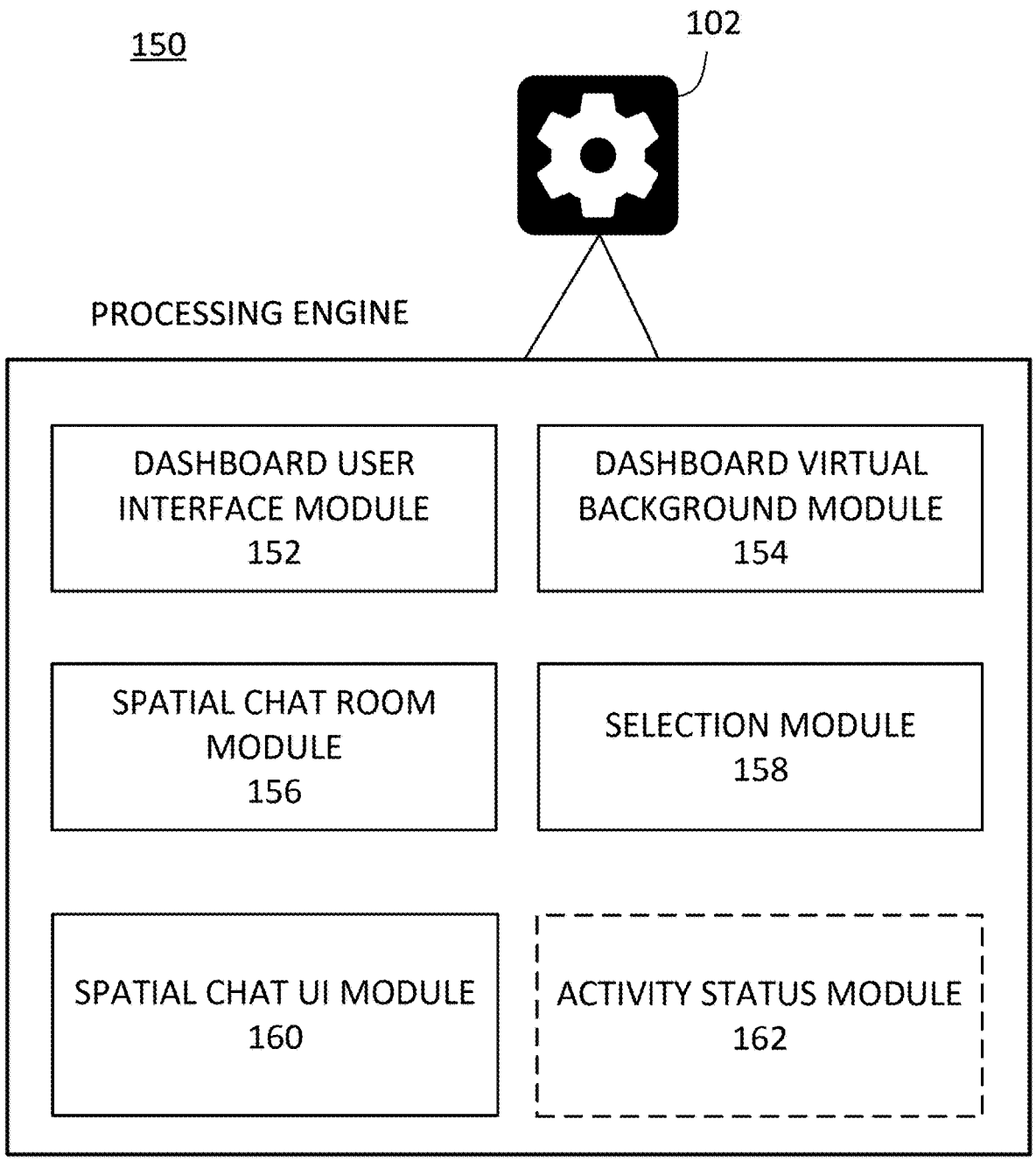
FIG. 1B is a diagram illustrating an exemplary computer system that may execute instructions to perform some of the methods herein.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

As users increasingly work from home and collaborate remotely, sometimes rarely or never meeting their colleagues in person, a sense of connection within chat platforms becomes more and more essential. One criticism levied against these typical chat experiences is that they are lacking a sense of connection. The typical chat experience enabled by a chat platform today can be seen as an endless stream of text, which can feel impersonal to many users. Since the only component binding the experience together is a text stream of messages, there is no sense of connectedness felt with one's team or collaborators, and a sense of community is lacking. A group that works together should feel connected, and that sense of connection is missing from the current chat experience.

Thus, there is a need in the field of digital communication tools and platforms to create new and useful systems and methods for providing a spatial chat view dashboard within a messaging platform in order to humanize the chat experience, enhance live conversation, and provide a sense of place, connectedness, and community during the chat experience.

Such systems and methods can provide a visual representation of multiple spatial chat "rooms", each with different participants represented by spatialized avatars. A dashboard virtual background is presented. Overlaid on the dashboard virtual background, a user can see, at a glance, different spatial chat rooms that the user has access to. In some embodiments, a user can hover over, click on, or otherwise interact with a particular chat room to see some details for it. A user then has the option to join a particular chat room. Upon joining, the view shifts toward a spatial chat user interface (hereinafter "UI"). The spatial chat UI shows the different elements of the spatial chat room, including a virtual background for that chat session, spatialized avatars representing the participants, and more.

The invention overcomes the existing problems by creating a sense of place and continuity between multiple virtual "locations" that the user may be switching between on a regular basis. Many users have more than a single chat session they are participating in at any given time. Just as spatial chat sessions can provide a sense of location and connectedness between participants by placing participants within, for example, an office space with avatars positioned at different locations, a spatial chat view dashboard positions multiple rooms within a larger encompassing space. For example, an office floor with multiple rooms may be envisioned, with the user able to switch between the different rooms as though walking through an office floor with multiple rooms. Another example may be a layout of a school, with multiple spatial chat rooms representing different classrooms, with a teacher and students inside each one. Students may be able to use such a dashboard view to easily switch from one classroom to the next throughout a typical school day, thus adding to the feeling and immersion of participating in a continuous school day experience. Many other such possibilities and configurations can exist.

In one embodiment, a method provides a spatial chat view dashboard within a messaging platform. A system displays, at a client device, a dashboard UI for a messaging platform, consisting of at least a dashboard virtual background and one or more spatial chat rooms. Each of the spatial chat rooms is a spatial representation of a chat session associated with a number of participants. The system receives, from the client device, a selection of a spatial chat room from the one or more spatial chat rooms. The system then displays a spatial chat UI comprising the selected spatial chat room.

Further areas of applicability of the present disclosure will become apparent from the remainder of the detailed description, the claims, and the drawings. The detailed description and specific examples are intended for illustration only and are not intended to limit the scope of the disclosure.

I. Exemplary Environments

FIG. 1A is a diagram illustrating an exemplary environment in which some embodiments may operate. In the exemplary environment 100, a user's client device 150 is connected to a processing engine 102 and, optionally, a chat platform 140. The processing engine 102 is connected to the chat platform 140, and optionally connected to one or more repositories and/or databases, including, e.g., a background repository 130, chat room repository 132, and/or an avatar repository 134. One or more of the databases may be combined or split into multiple databases. The user's client device 150 in this environment may be a computer, and the chat platform 140 and processing engine 102 may be applications or software hosted on a computer or multiple computers which are communicatively coupled via remote server or locally.

The exemplary environment 100 is illustrated with only one client device, one processing engine, and one chat platform, though in practice there may be more or fewer additional client devices, processing engines, and/or chat platforms. In some embodiments, the client device(s), processing engine, and/or chat platform may be part of the same computer or device.

Figure 2:
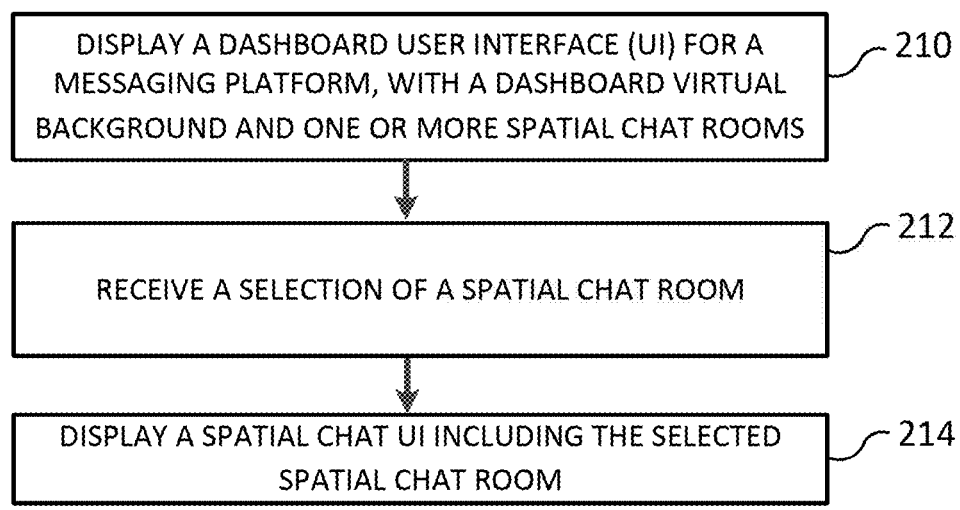
FIG. 2 is a flow chart illustrating an exemplary method that may be performed in some embodiments.

In an embodiment, the processing engine 102 may perform the exemplary method of FIG. 2 or other method herein and, as a result, provide a spatial chat view dashboard within the chat platform. In some embodiments, this may be accomplished via communication with the user's client device, processing engine, chat platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The user's client device 150 is a device with a display configured to present information to a user of the device. In some embodiments, the client device presents information in the form of a visual UI with multiple selectable UI elements or components. In some embodiments, the client device 150 is configured to send and receive signals and/or information to the processing engine 102 and/or chat platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or chat platform 140 may be hosted in whole or in part as an application or web service executed on the client device 150. In some embodiments, one or more of the chat platform 140, processing engine 102, and client device 150 may be the same device. In some embodiments, the user's client device 150 is associated with a first user account within a chat platform, and one or more additional client device(s) may be associated with additional user account(s) within the chat platform.

In some embodiments, optional repositories can include one or more of a background repository 130, chat room repository 132, and/or avatar repository 134. The optional repositories function to store and/or maintain, respectively, dashboard virtual backgrounds, spatial chat rooms accessible from within the dashboard view, and spatialized avatars corresponding to participants within a chat room. The optional database(s) may also store and/or maintain any other suitable information for the processing engine 102 or chat platform 140 to perform elements of the methods and systems herein. In some embodiments, the optional database(s) can be queried by one or more components of system 100 (e.g., by the processing engine 102), and specific stored data in the database(s) can be retrieved.

Chat platform 140 is a platform configured to facilitate communication between two or more parties, such as within a real-time conversation. A chat room may host a chat session within the chat platform 140. A chat session may constitute, e.g., a one-time chat session that will be inaccessible once the participants leave or the session ends, or it may be a persistent chat channel that remains accessible for a set of participants regardless of any one participant leaving or entering. The communication session may be, e.g., one-to-many (e.g., a participant engaging in messaging with multiple attendees), one-to-one (e.g., two friends messaging with one another), or many-to-many (e.g., multiple participants messaging with each other in a group chat setting).

In some embodiments, the chat platform 140 may be connected to, integrated with, or part of a communication platform. In some embodiments, the communication platform is provided so that video, audio, or audiovisual communication may be configured to occur alongside chat within a single session. In some embodiments, there may be one or more separate chat sessions and one or more separate audio and/or video sessions, but some integration may occur between voice and chat sessions. For the sake of readability, if the chat platform 140 is part of or integrated with a communication platform in some way, this application will refer to this integration or combination as simply a chat platform.

FIG. 1B is a diagram illustrating an exemplary computer system 150 with software modules that may execute some of the functionality described herein. In some embodiments, the modules illustrated are components of the processing engine 102.

Dashboard user interface module 152 functions to display, at a client device associated with a user of a chat platform, a dashboard UI consisting of a dashboard virtual background and one or more spatial chat rooms.

Dashboard virtual background module 154 functions to configure the dashboard virtual background to be displayed within the dashboard UI.

Spatial chat room module 156 functions to configure the spatial chat rooms to be displayed within the dashboard UI.

Selection module 158 functions to receive, from the client device, a selection of a spatial chat room from the one or more spatial chat rooms shown in the dashboard UI.

Spatial chat UI module functions to display a spatial chat UI consisting of the selected spatial chat room and its hosted chat session.

Optional activity status module 162 functions to determine an activity status for each of the spatial chat rooms within the dashboard UI, and display the activity status of at least one spatial chat room within the dashboard UI.

The above modules and their functions will be described in further detail in relation to an exemplary method below.

II. Exemplary Method

FIG. 2 is a flow chart illustrating an exemplary method that may be performed in some embodiments.

At step 210, the system displays a dashboard UI at a client device associated with a user of a chat or messaging platform. The displayed dashboard UI consists of at least a dashboard virtual background, and one or more spatial chat rooms. The user interfaces with this dashboard UI via the client device, within a chat platform that facilitates a number of chat sessions that user will have access to (i.e., chat sessions the user has been invited to, chat sessions the user has created and invited other participants to, recurring chat sessions, and more).

A spatial chat room is a visual representation of a chat room that hosts or otherwise facilitates a chat session within the chat platform. In some embodiments, a chat session is any form of participants communicating with one another, whether that communication takes the form of, e.g., a one-on-one chat between two participants or a chat with more than two participants. In some cases, a chat session may be a session which occurs through a chat channel, i.e., a virtual venue within the chat platform for persistent conversations between participants, wherein the venue and session are not confined to a set time after which they are terminated, but rather remain open for a longer period of time as participants enter and leave, or become active or inactive. In some cases, a chat session may be a session which occurs through an in-meeting chat. For example, a video meeting may take place between participants. As part of that video meeting, a chat session may be opened up alongside the video, and participants of the video meeting can chat with one another in a chat format during the video meeting. Other possibilities and configurations for chat sessions can be contemplated.

The system displays a dashboard virtual background as part of the dashboard chat UI. The dashboard virtual background may consist of visual media, such as, e.g., an image, video, presentation document (e.g., presentation slides), word processor document, PDF document, animated image, web site, or interactive interface. The dashboard virtual background is intended to be a representation of a larger space which encompasses a set of smaller spaces, i.e., the spatial chat rooms. One example of a dashboard virtual background may be a floor plan of a school, with a number of classrooms represented within the floor plan. Another example may be a layout of a floor of an office building, with a number of office rooms contained within that layout.

In some embodiments, the dashboard virtual background is prespecified. In some embodiments, the dashboard virtual background can be prespecified as a default media background. For example, the system may automatically default to displaying a solid grey background, a default image of an office floor plan or school, or some other image or visual media. In some embodiments, the dashboard virtual background was previously selected by the user, an administrator, host, or other designated individual for a previous instance of dashboard UI. In some cases, the dashboard virtual background is dynamically generated in real time based on one or more factors. Factors may include, for example, metadata about the working space of an organization, metadata about chat sessions which are active that participants of an organization have access to, and more.

In some embodiments, the dashboard virtual background is selected by an administrator, host, or other designated individual with permission to manage chat sessions or the dashboard. In some embodiments, the media background is received as a selection from the first user or one of the additional users from a pre-defined set of media backgrounds. In some cases, a user may upload or otherwise retrieve a dashboard virtual background from the user's client device or an external source, or generate a dashboard virtual background themselves, then import it into the chat platform. An administrator may, for example, decide to upload an overhead floor plan or layout of an office space, and participants may be able to enter rooms within the floor plan using the dashboard UI.

In some embodiments, an administrator, host, or other designated individual with permission may change or alter the dashboard virtual background. For example, in the middle of viewing a dashboard UI, an administrator may decide to swap the dashboard virtual background for a different dashboard virtual background. This new dashboard virtual background can then be shown as a replacement, and participants can join chat rooms shown within the new dashboard virtual background.

The system also displays one or more spatial chat rooms within the dashboard UI. Each of the spatial chat rooms is a spatial representation of a chat session associated with a number of participants. In some embodiments, a name for each spatial chat room is displayed adjacent to or within the depiction of the spatial chat room. In some embodiments, one or more details about the spatial chat room are additionally displayed, such as, e.g., how long ago someone was active in sending a message in the chat room, or one or more of the participants within the chat room. In some embodiments, only the currently active, available participants of the chat room may be displayed. The spatial chat room may be depicted by a media image, such as a still image or animated image depicting the chat room. In some embodiments, this media image can be uploaded by an administrator, host, or other individual with managing permissions. In some embodiments, the spatial chat room may itself have a virtual background which has been prespecified or selected by one of the managing individuals or participants within the spatial chat room, and this virtual background for the spatial chat room is displayed within the dashboard virtual background to visually depict the spatial chat room. In some embodiments, a portion of the virtual background for the spatial chat room is displayed, rather than the full virtual background.

In some embodiments, a user engaging or interacting with the depicted spatial chat room elements may lead to additional details being displayed about the spatial chat room. In some embodiments, an additional window or other UI element appears with these details, including such details as one or more of, e.g., the name of the spatial chat session within the spatial chat room, how long ago the last activity within the chat session took place, number of participants, list of participants, list of currently active participants within the chat session, the name of the host, administrator, or creator of the chat session, the subject matter or description of the chat session, the last contributed message within the chat session, and any other suitable or relevant details. In some embodiments, engaging or interacting with the depicted spatial chat room may show a larger view of the virtual background of the spatial chat room, including spatial avatars positioned throughout the virtual background within the spatial chat session.

At step 212, the system receives a selection of a spatial chat room. This selection is received from the client device associated with the user. For example, the user may interact with elements of the dashboard UI to select a particular spatial chat room which the user wishes to enter. This interaction may be clicking on the depicted spatial chat room, speaking the name of the spatial chat room into a connected microphone, or any other form of suitable interaction.

At step 214, in response to receiving the selection of the spatial chat room, the system displays a spatial chat user interface ("UP") consisting of the selected spatial chat room, with the chat session occurring within the spatial chat room being shown. In some embodiments, the spatial chat user interface is displayed with a virtual background for the spatial chat session, spatialized avatars, and/or a message composing component.

In some embodiments, the system displays a virtual background as part of the spatial chat UI. The virtual background may consist of visual media, such e.g., an image, video, presentation document (e.g., presentation slides), word processor document, PDF document, animated image, web site, or interactive interface.

In some embodiments, the virtual background is prespecified. In some embodiments, the virtual background is pre-specified as a default media background. For example, the system may automatically default to displaying a solid grey background, a default image of an office floor plan or classroom, or some other image or visual media. In some embodiments, the virtual background was previously selected by an administrator, host, or other designated individual for a previous instance of the chat session or similar chat session, such as when a recurring chat session is established. In some cases, the virtual background is dynamically generated in real time based on one or more factors. Factors may include, for example, the organizational hierarchy of a company the participants are associated with, a detected subject matter of the chat session, a context detected from chat content, and more.

In some embodiments, the virtual background is selected by an administrator, host, or other designated individual with permission to manage the chat session. In some embodiments, the media background is received as a selection from the first user or one of the additional users from a pre-defined set of media backgrounds. In some cases, a user may upload or otherwise retrieve a virtual background from the user's client device or an external source, or generate a virtual background themselves, then import it into the chat platform. An administrator may, for example, decide to upload an overhead floor plan or layout of an office space, and participants may all be able to position their avatars at their desks within this virtual office space.

In some embodiments, an administrator, host, or other designated individual with permission may change or alter the virtual background. For example, in the middle of a chat session, a host participant may decide to swap the virtual background for a different virtual background. This new virtual background can then be shown as a replacement, and participants can position their avatars within the new virtual background.

In some embodiments, the system displays one or more spatialized avatars as part of the spatial chat UI. Each of the spatialized avatars is a visual UI component within the spatial chat UI. Each spatialized avatar is a representation of one of the participants, and appears overlaid on the virtual background. Each of the spatialized avatars is positioned in a spatialized fashion throughout the length and width of the virtual background. In this way, each of the avatars representing participants can be positioned in a space within the virtual background. For example, if the virtual background is an office plan for a group of coworkers, then the coworkers would all have avatars representing themselves, and these avatars can be positioned in their actual work locations within the office space. Similar, a classroom where students are all seated within a fixed seating arrangement can be represented, with spatialized avatars being positioned at their seats corresponding to the participant students, with the teacher positioned at the front of the classroom. In some embodiments, different positions of avatars may indicate that the participants are working from home or working within a particular office, for example, or some other split between or categorization of participants may be indicated based on the positioning. In some embodiments, avatars can be positioned within different virtual rooms within the virtual background, indicating different conversational spaces or breakout rooms for communicating with a subset of the participants. In some embodiments, different rooms within the virtual background can be assigned different meanings or assigned to different meetings, such that avatars may be automatically repositioned to those rooms based on participating in certain meetings or in other contexts.

In some embodiments, the spatial avatars may be represented as circles or rounded images, although any visual design for avatars may be contemplated. In some embodiments, users may upload a selected image of themselves, which is displayed as their avatar. For example, a rounded circle with the face of a participant may be appear within a spatial chat UI. In some embodiments, administrators or those with managing permissions for the chat session may be able to upload images of participants to appear within their avatars. In some embodiments, images of participants may be automatically retrieved from a company database or directory. In some embodiments, spatialized avatars may be three-dimensional avatars representing the participant in some way, e.g., either realistically or in some other way, such as via a cartoon depiction. In some embodiments, the avatar may be a two-dimensional or three-dimensional avatar the participant can design themselves from a set of options and/or slider components for selecting features and parameters (such as through an avatar building interface, where a participant can select, e.g., a hairstyle, hair color, facial shape, clothing, and more). Many other such possibilities may be contemplated for the visual design of the spatialized avatars.

In some embodiments, each of the participants of the chat session may be allowed to position their corresponding spatialized avatar at a location within the frame of the virtual background. For example, the interface may provide for a participant to click or hold their own representative avatar, then drag the avatar to a desired new location within the virtual background. In some embodiments, participants may not have permission to reposition their avatars, but an administrator, host, or other individual with managing permissions may be able to position or reposition avatars to locations within the virtual background (such as, for example, when a teacher is given permission to position students at desks within a classroom, but the students themselves cannot position or reposition themselves within the classroom). In some embodiments, one or more arrows or other indicating elements may be present within the UI to assist in participants moving their avatars around, or in navigating through the space of the virtual background.

In some embodiments, the system displays a message composing component as part of the spatial chat UI. The message composing component includes UI elements which allow a participant to submit a text-based message, and/or potentially other content to be sent as communications within the chat and displayed for participants within the chat session. In various embodiments, the message composing component can consist of one or more of, e.g., a message text field, a message submit button, a screenshot capturing component, a file uploading component (for uploading, e.g., a still image, an animated image, a PDF document, an audio file, or any other file), a component for recording an audio message to be sent within the chat session, and a component for sharing a non-text-based expression, such as an emoji or reaction. In some embodiments, the message composing component is a separate window or component within the spatial chat UI. An example of a message composing component will be discussed further below with respect to FIG. 3A.

In some embodiments, prior to displaying the UI, the system displays a non-spatial chat UI. For example, a linear, non-spatial chat where text messages are shown from top to bottom, without a virtual background or spatialized avatars, may be displayed. A participant may then opt, within this interface, to toggle to a spatial chat view with spatialized avatars. The UI is then replaced with a spatial chat UI as described herein. In some embodiments, participants may have the option to toggle back and forth between a spatial chat UI and a non-spatial chat UI at will, and the change is implemented in real-time, such as during a chat session.

In some embodiments, the system displays chat bubbles corresponding to messages sent by a subset of the participants. The chat bubbles are displayed such that they appear adjacent to the spatialized avatars representing those participants. In some embodiments, the messages are submitted by the participants through their interactions with the messaging composing component of the spatial chat UI seen by the participants.

In some embodiments, the chat bubbles appear as e.g., bounded rectangles with rounded edges to present the appearance of a "bubble" which encapsulates the message. In other embodiments, such a "bubble" appearance may not be necessary for a chat bubble, but rather any visual design to encapsulate a message within a bounded visual element or component is displayed. In some cases, for example, a chat bubble may not have rounded edges, may be a circle instead of a rectangle, may have no visual border or boundary, may be transparent or semi-transparent, or any of a number of other visual possibilities.

In some embodiments, the system receives a message from a participant, via the message composing component of the spatial chat UI that the participant is interacting with through their client device. The system displays the message within a chat bubble, which appears adjacent to the spatialized avatar corresponding to that participant. One example of a chat bubble is illustrated in FIG. 3C, which is described in detail below.

In some embodiments, chat may be audio-only between some or all of the participants. In some embodiments, for example, a voice channel may be enabled, and rather than chat bubbles appearing, an audio-based conversation can be provided between participants with no text messages present. In some embodiments, a link to join an ongoing call or meeting may be provided and upon engaging with the link, a participant is routed to that call or meeting to participate.

In some embodiments, a participant may reply to a message sent by another participant. In some embodiments, a participant using the spatial chat UI may hover over a chat bubble within the UI, and a submenu may appear allowing the user to choose between various elements, such as, e.g., a message reply element and an emoji reply element. If the participant selects the message reply element, a message reply field is displayed, allowing the user to submit a message. Upon submitting the message, it appears as a reply to the message within the chat bubble. In some embodiments, the reply appears as a message that is in response to the original message. In some embodiments, this may be a threaded reply, wherein the message branches into a set of one or more replies to the message. In some embodiments, a reply message may simply be displayed as any other message, but some indicator or notification that a particular participant is being responded to may appear (for example, an "@" symbol may appear in front of a participant's name, such as "@Hana Song", representing that Hana Song has been replied to. The participant Hana Song may additionally get a notification, if such a notification is configured to be enabled within that participant's settings and preferences for the chat session.

In some embodiments, while a participant is typing a message into the message composing field within their spatial chat UI, the system will display a chat bubble adjacent to the spatialized avatar for that participant, indicating that the participant is currently typing a message. For example, a chat bubble displaying an animated, moving ellipses (" . . . ") may appear within a chat bubble, indicating that the participant is currently typing.

In some embodiments, the system receives a selection of an emoji, reaction, or some other non-text-based visual communication from a participant via the message composing component. In some cases, this emoji, reaction, or other communication appears within a chat bubble, as would any text-based message. In other cases, it may be displayed differently from a text-based message. For example, in some embodiments, a selected emoji may appear adjacent to the spatialized avatar in question, without being encapsulated within a chat bubble. In some embodiments, the emoji may be animated, have some sparkle or other animated effect in conjunction with the emoji itself, or otherwise be displayed in a way that calls attention to that participant reacting to something within the chat session, or expressing themselves in some way other than through text. In some embodiments, such emojis or reactions may also be sent as replies to other messages, and may appear within a threaded reply space a message in a special way (e.g., animated or with some accompanying effect). In some embodiments, rather than appearing adjacent to the avatar, the emoji may appear, for example, at the top, bottom, center, or side of the spatial chat UI, within a special frame or window, or otherwise in some way decoupled from the spatialized avatar.

In some embodiments, the system determines an availability status for each of the multiple participants. In some embodiments, this determination may occur concurrently to, prior to, or after one or more other steps. An availability status represents whether the participant in question is currently available or not within the chat session. In various embodiments, unavailability may mean one or more of, e.g., the participant self-identifying as busy or unavailable (such as selecting a UI component to indicate that they are busy or away from their client device), the system identifying that the participant is in a meeting or different chat session and unavailable, the system identifying that the participant is not present within the chat session, the system identifying that the participant has been idle and inactive within the chat session or at their client device for a period of time, the system identifying that the participant is on paid time off or sick leave for the day, the participant indicating that they are in "do not disturb" mode and should not be contacted within the chat session or receive notifications pertaining to it, or any other similar indication that the participant is unable to currently participate in the chat session or is not viewing messages or participating at the moment. In some embodiments, a participant can hover over or click on a participant's spatialized avatar to see a more detailed status regarding the availability of that participant, such as, e.g., the name of a meeting if the user is attending one.

In some embodiments, the availability status for each of the plurality of participants corresponds to at least the current activity level of the participant within the chat session. In some embodiments, both the current activity level and the availability of the participant within the messaging session are factors in determining an availability status.

In some embodiments, the availability status for each of the plurality of participants corresponds to some period of time of activity or inactivity. For example, the availability status may indicate that the participant was last active within the chat session 15 minutes ago. In some embodiments, the system may determine based on GPS or other locational detection on the participant's client device that the client is "out of office" for a specified location of a physical office space, for example, or other specified location, and determine unavailability based on this physical location detected for the participant.

In some embodiments, the system displays a visual indicator of availability status for each participant. In some embodiments, this displaying may occur concurrently to, prior to, or after one or more other steps. This visual indicator is displayed within or adjacent to each of the spatialized avatars. The visual indicators communicate, within the spatial chat UI, the availability status of the participants represented by the spatialized avatars.

In some embodiments, the visual indicators for availability are differentiated from one another based on different colors, different visual elements, or other visual distinguishing features. In some embodiments, the visual indicator may be an automatically generated text status, such as, e.g., "Last active 15 minutes ago", or may be a text status submitted by the participant themselves, such as, for example, "be right back in a few minutes". In some embodiments, the visual indicator may be presented as a solid circle around the border of the avatar for the participant being available, and a thatched, dashed, or semi-transparent circle around the border of the avatar for the participant being unavailable. One example of visual indicators for availability is illustrated in FIG. 3A, which is described in further detail below.

In some embodiments, the spatial chat UI may present one or more actions which can be presented based on availability status. For example, the spatial UI may present participants with the option to send a message to, start a phone call with, or start a meeting with everyone who is currently indicated to be available. In some embodiments, a host may be allowed to reposition avatars in a certain room which may be designated as a meeting room, in order to discuss something with those participants but not other participants. In such a case, the messages between those participants may not be visible to participants outside of that room.

In some embodiments, a participant interacting with the spatial chat UI may interact with one of the spatial avatars within the interface by, e.g., clicking, touching, or tapping on the avatar, depending on the preferred control input being used by the participant. In some embodiments, upon interacting with the avatar, a summary window appears for that avatar. The summary window includes one or more pieces of information about the participant represented by the spatial avatar, including one or more of, e.g., name, username or pseudonym, availability status, organizational title, profile or biographical statement, meeting currently being attended by the participant, and more.

Figure 3A:
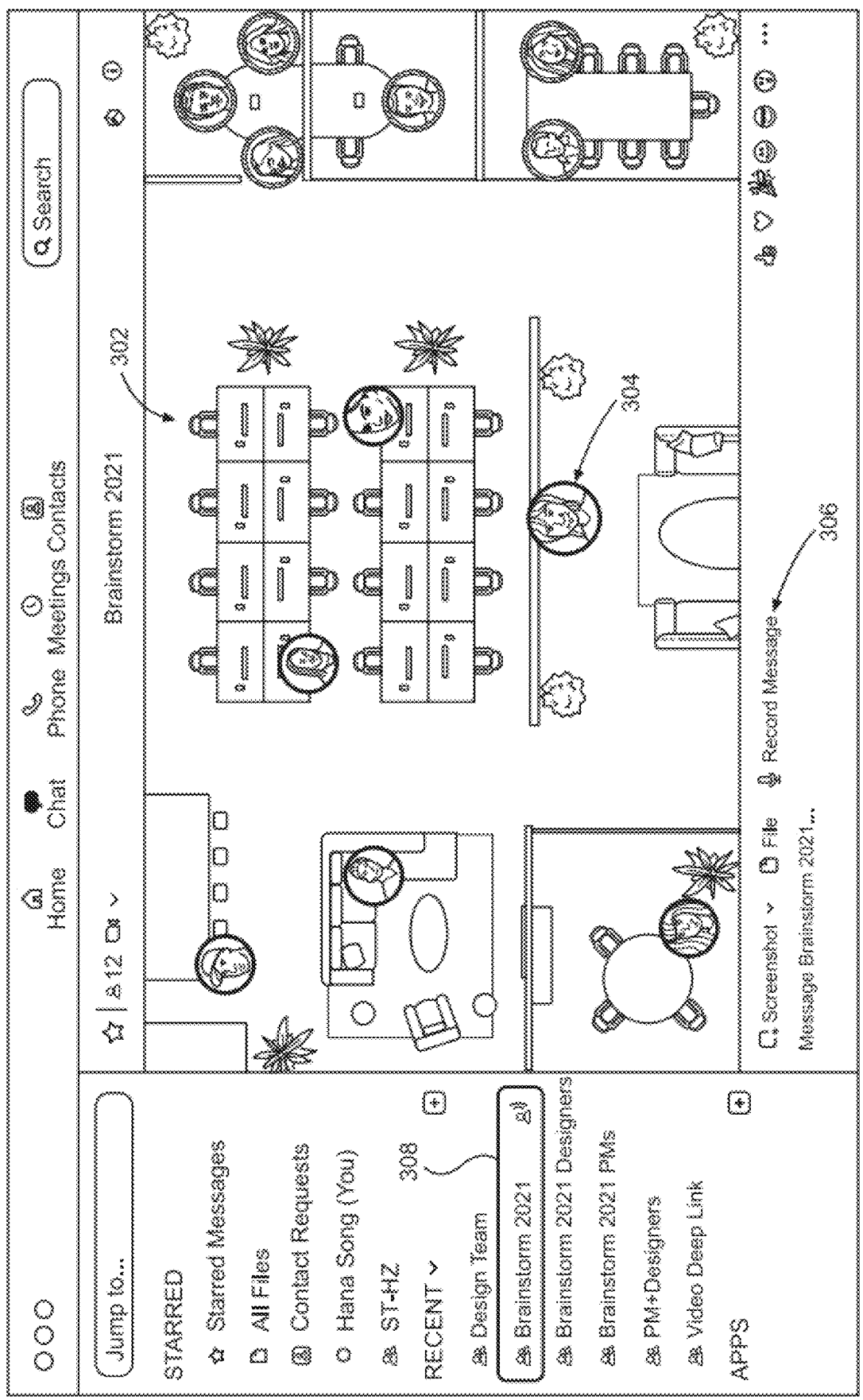
FIG. 3A is a diagram illustrating one example embodiment of a spatial chat UI, according to some embodiments.

FIG. 3A is a diagram illustrating one example embodiment of a spatial chat UI depicting an individual spatial chat session, according to some embodiments. The figure illustrates an example of a spatial chat UI which may be displayed for a particular participant of a chat session. In this case, the participant is named Hana Song, as shown in the sidebar UI component on the left. The main UI window shows a virtual background 302 which represents an office layout, as seen from overhead. In some embodiments, the virtual background is prespecified. The virtual background may be, e.g., prespecified from an earlier section with some or all of the participants, may be prespecified in advance when an administrator, host, or other participant with managing permissions created the chat session, may be prespecified dynamically by the system based on context about the meeting and/or the participants, or may be prespecified as a default selection in the absence of other selections.

The participant who is viewing the spatial chat UI can see her own spatial avatar 304, which represents her as a participant. In the illustrated example, her spatial avatar is slightly larger than the others. In some embodiments, this may be indicating that the avatar has just recently sent a message or is about to send a message.

Message composing component 306 is displayed as a UI component at the bottom of the interface. This component as illustrated shows a text field where the participant can enter a message to be sent within the chat session. Components are also shown for capturing a screenshot, uploading a file to be accessed by the participants, and recording a message which can be played back by participants. On the right, a participant can select an emoji to be displayed adjacent to their avatar, or the three ellipses (" . . . ") can be selected for additional options, such as for sending other non-text-based expressions to be displayed in the spatial chat UI.

On the sidebar to the left, a chat session 308 is displayed with title, with a visual indicator that the participant is currently active and/or present in that room. Other recent chat rooms are displayed as well. The participant can select a different chat room to switch the spatial chat UI from displaying the current chat session to displaying a different one.

Additional spatial avatars are also displayed, representing the participant's coworkers within the chat session. Some of the avatars are shown with one visual indicator of availability status, indicating they are available and/or active, while other avatars have a different visual indicator, indicating they are busy and/or inactive for some time. In the illustrated example, the visual indicators shown are a solid circle around the border of the avatar for the participant being available, or a thatched circle around the border of the avatar for the participant being unavailable.

Figure 3B:
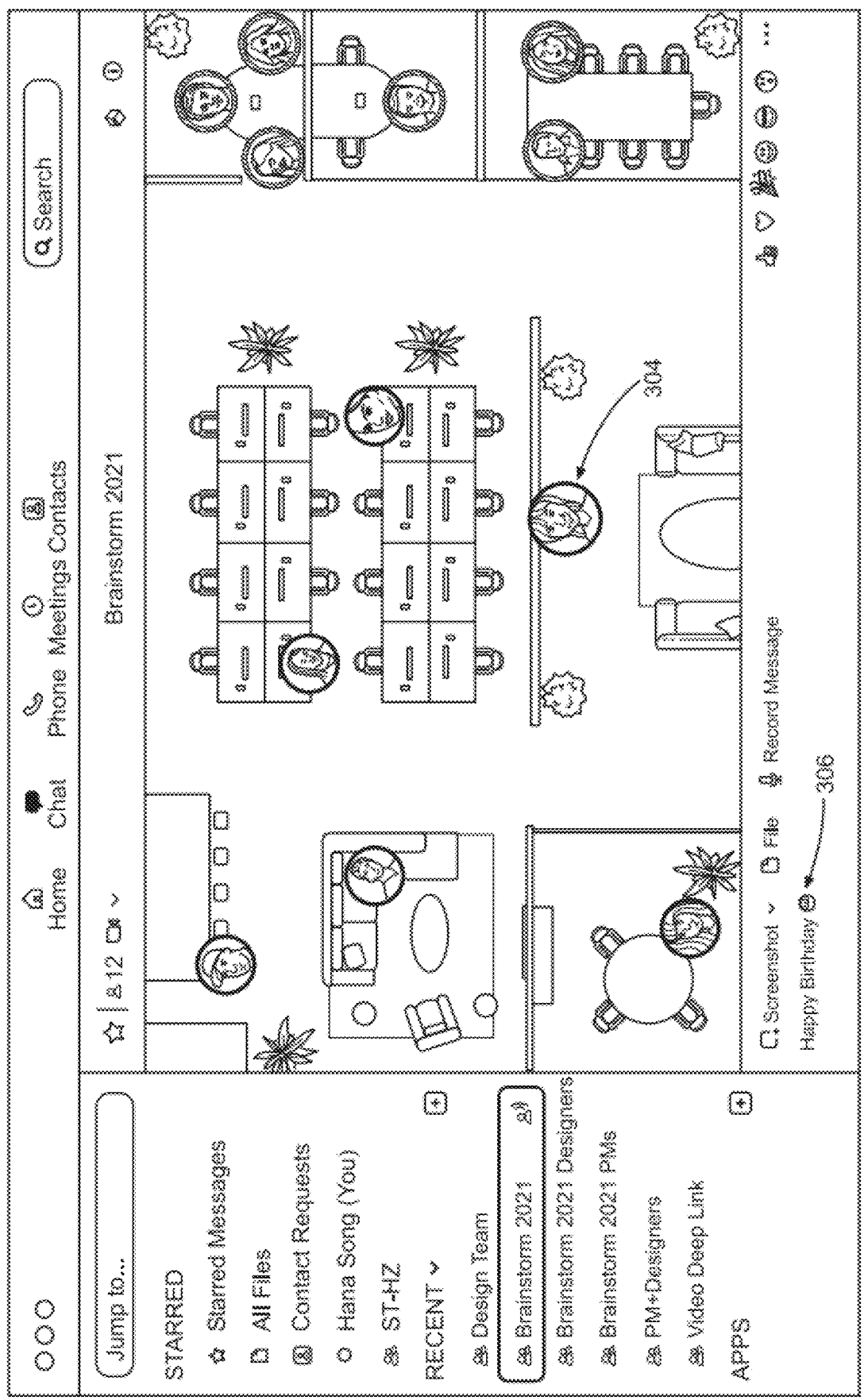
FIG. 3B is a diagram illustrating one example embodiment of entering a message into a spatial chat view, according to some embodiments.
Figure 3C:
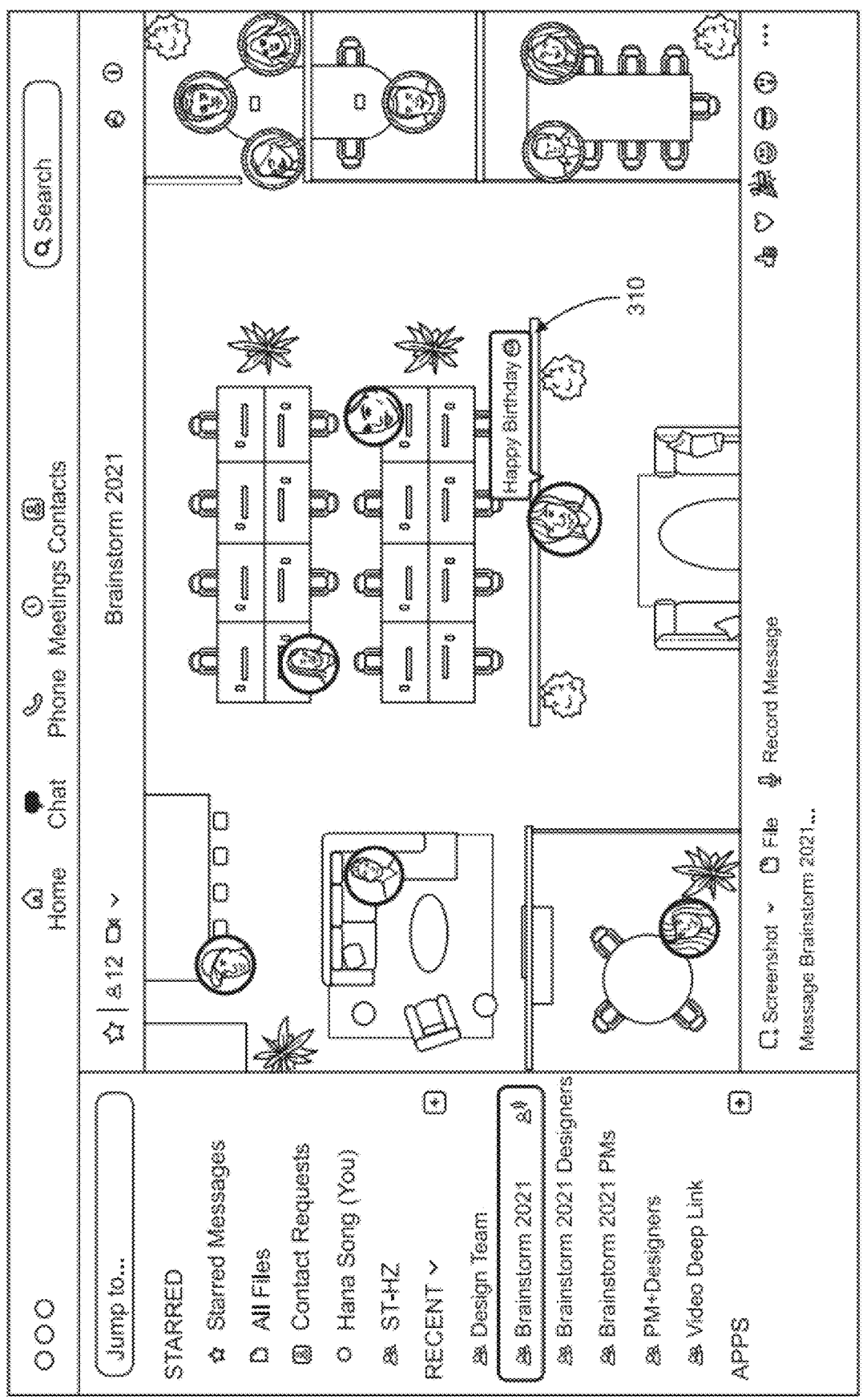
FIG. 3C is a diagram illustrating one example embodiment of a message being displayed in a spatial chat view, according to some embodiments.

FIG. 3B is a diagram illustrating one example embodiment of entering a message into a spatial chat view, according to some embodiments.

The example illustrates the same chat session and spatial chat UI as in FIG. 3A. Here, the participant has entered a message into the message field 306. The message is a mixture of text ("Happy Birthday") and a non-text emoji of a birthday cake.

FIG. 3C is a diagram illustrating one example embodiment of a message being displayed in a spatial chat view, according to some embodiments.

Here, the message from FIG. 3B has been submitted, and the participant can see that the message 310 has appeared in a chat bubble adjacent to the participant's corresponding spatial avatar within the spatial chat UI. In some embodiments, this chat bubble is designated a different color or otherwise visually demarcated to indicate that the message is from the participant herself, rather than a different participant.

Figure 3D:
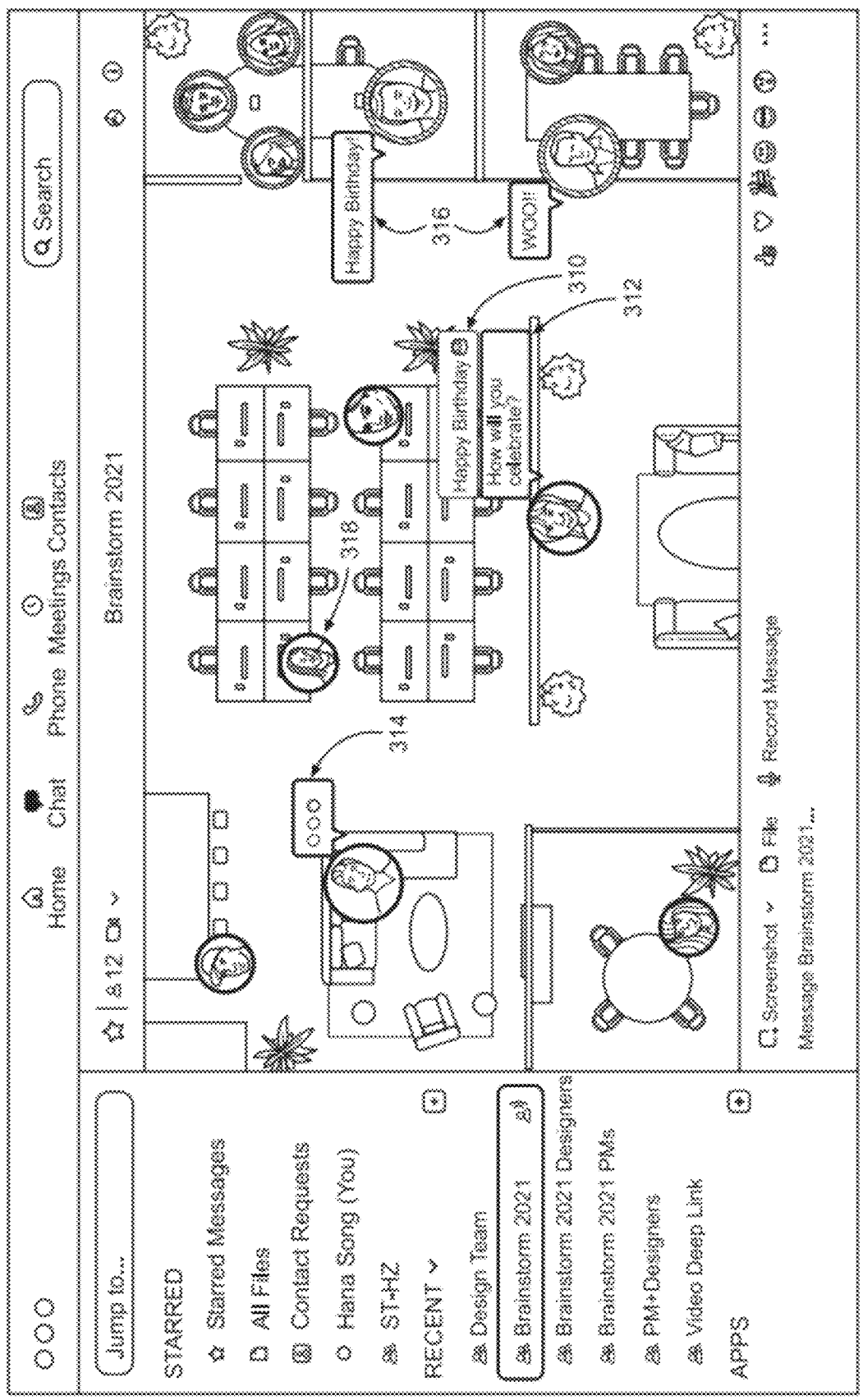
FIG. 3D is a diagram illustrating one example embodiment of multiple participants interacting in a spatial chat view, according to some embodiments.

FIG. 3D is a diagram illustrating one example embodiment of multiple participants interacting in a spatial chat view, according to some embodiments.

Figure 3E:
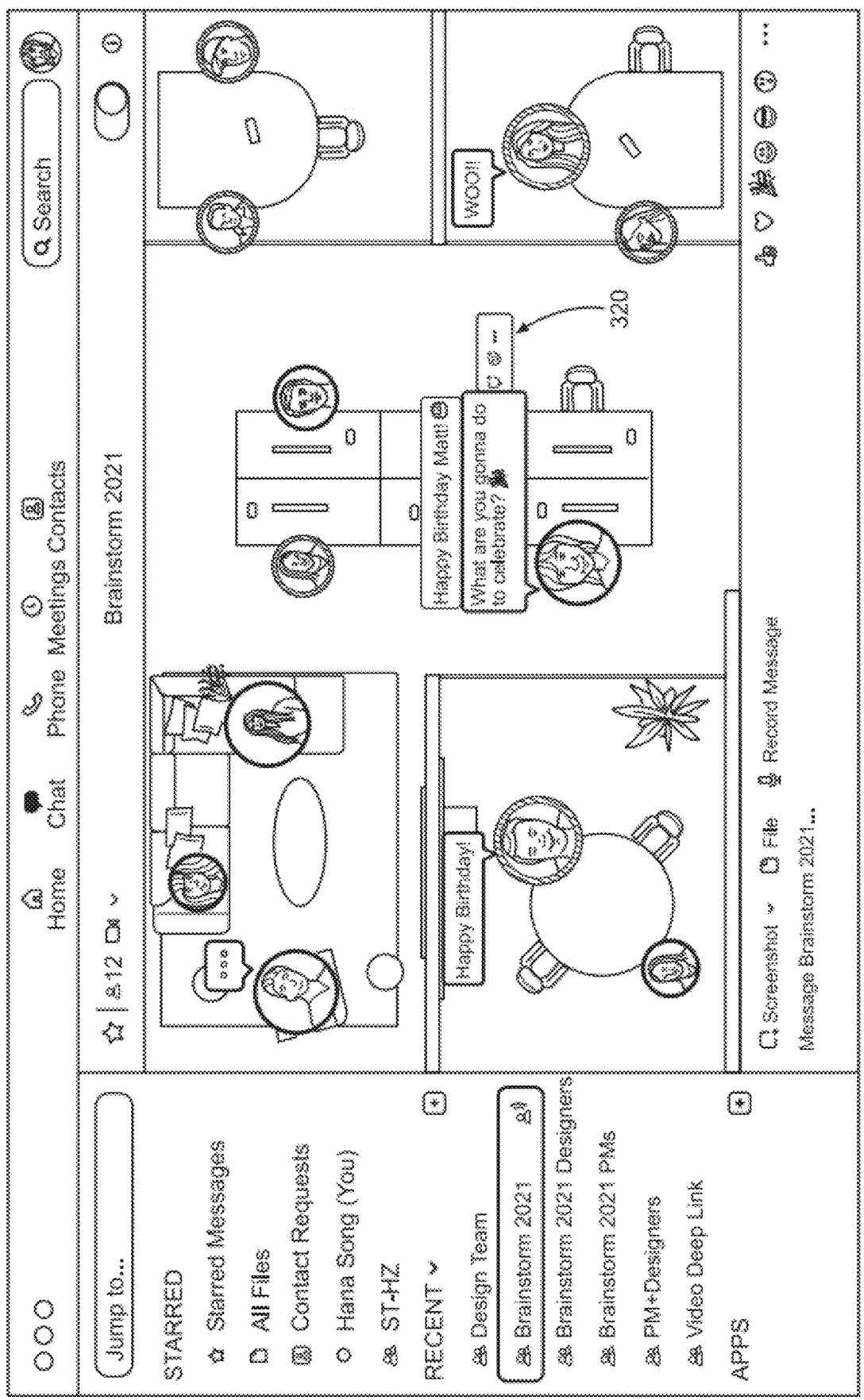
FIG. 3E is a diagram illustrating one example embodiment of a submenu for a displayed message, according to some embodiments.

In reply to the message shown in FIG. 3E, other participants within the chat have begun to respond in this illustrated example. The message 310 is still present, but has faded in appearance to indicate that it is an older message. A newer message 312 from the participant herself is displayed as a follow up, replacing the prior message 310 and moving the prior message up visually. A chat bubble 314 indicates that a participant is currently typing a message to be posted into the chat session. Additional chat bubbles 316 indicate other messages sent from participants. One participant 318 has reacted to the original message with an emoji indicating a party hat, which is displayed adjacent to the participant's spatial avatar, albeit not within a chat bubble.

FIG. 3E is a diagram illustrating one example embodiment of a submenu for a displayed message, according to some embodiments. If the participant clicks on a message within a chat bubble, an additional submenu 320 will appear adjacent to that chat bubble. The additional submenu illustrated shows UI components for a reply message, a reply emoji, and ellipses for additional options. The user may click on or otherwise interact with these components within the submenu for additional chat options.

Figure 3F:
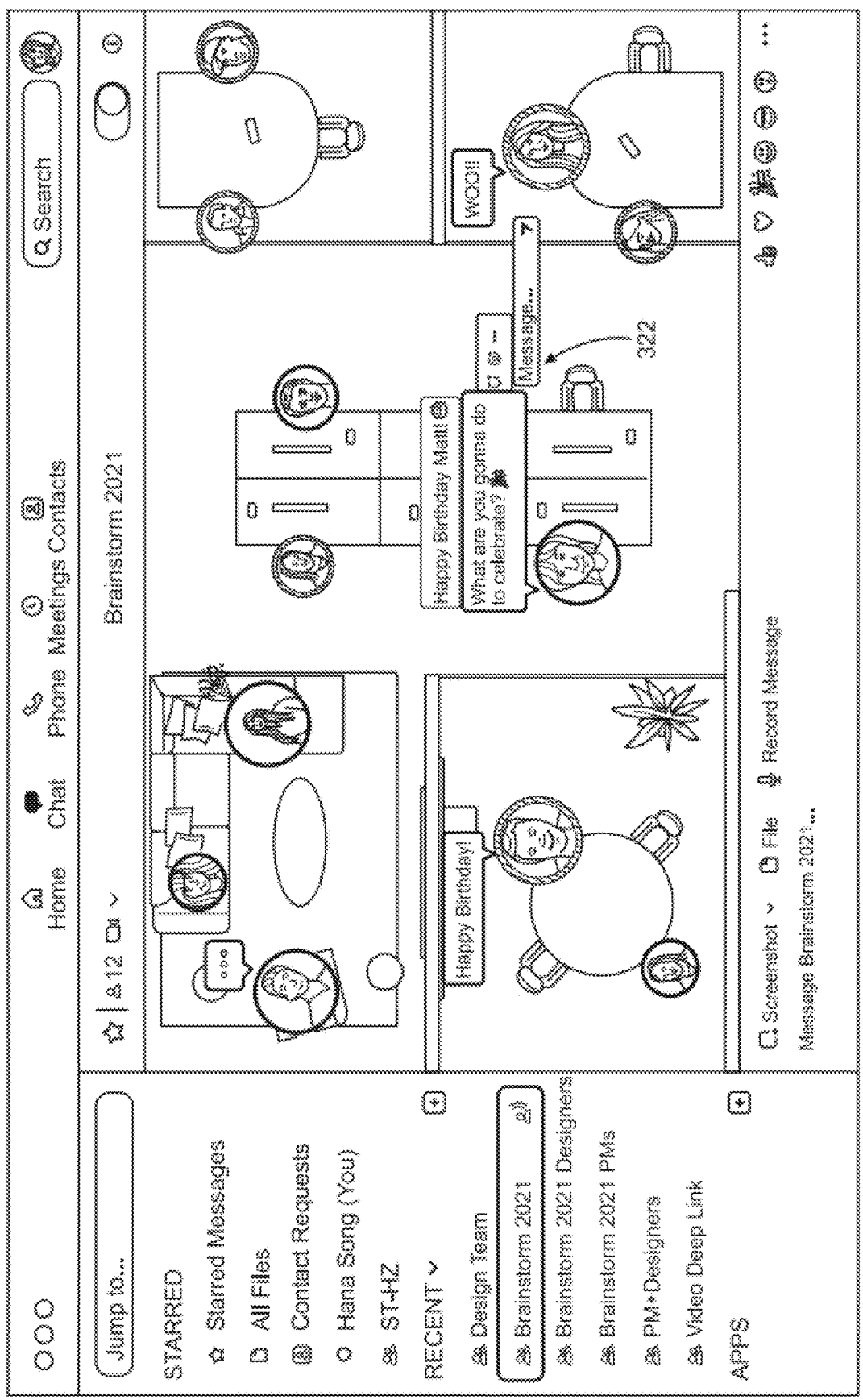
FIG. 3F is a diagram illustrating one example embodiment of a threaded reply field for a displayed message, according to some embodiments.

FIG. 3F is a diagram illustrating one example embodiment of a threaded reply field for a displayed message, according to some embodiments.

Here, the participant viewing the submenu from FIG. 3E has interacted with the reply message component. In response, the spatial chat UI displays a threaded reply text field 322 where the participant can input a message. A submit button appears at the right of this text field.

Figure 3G:
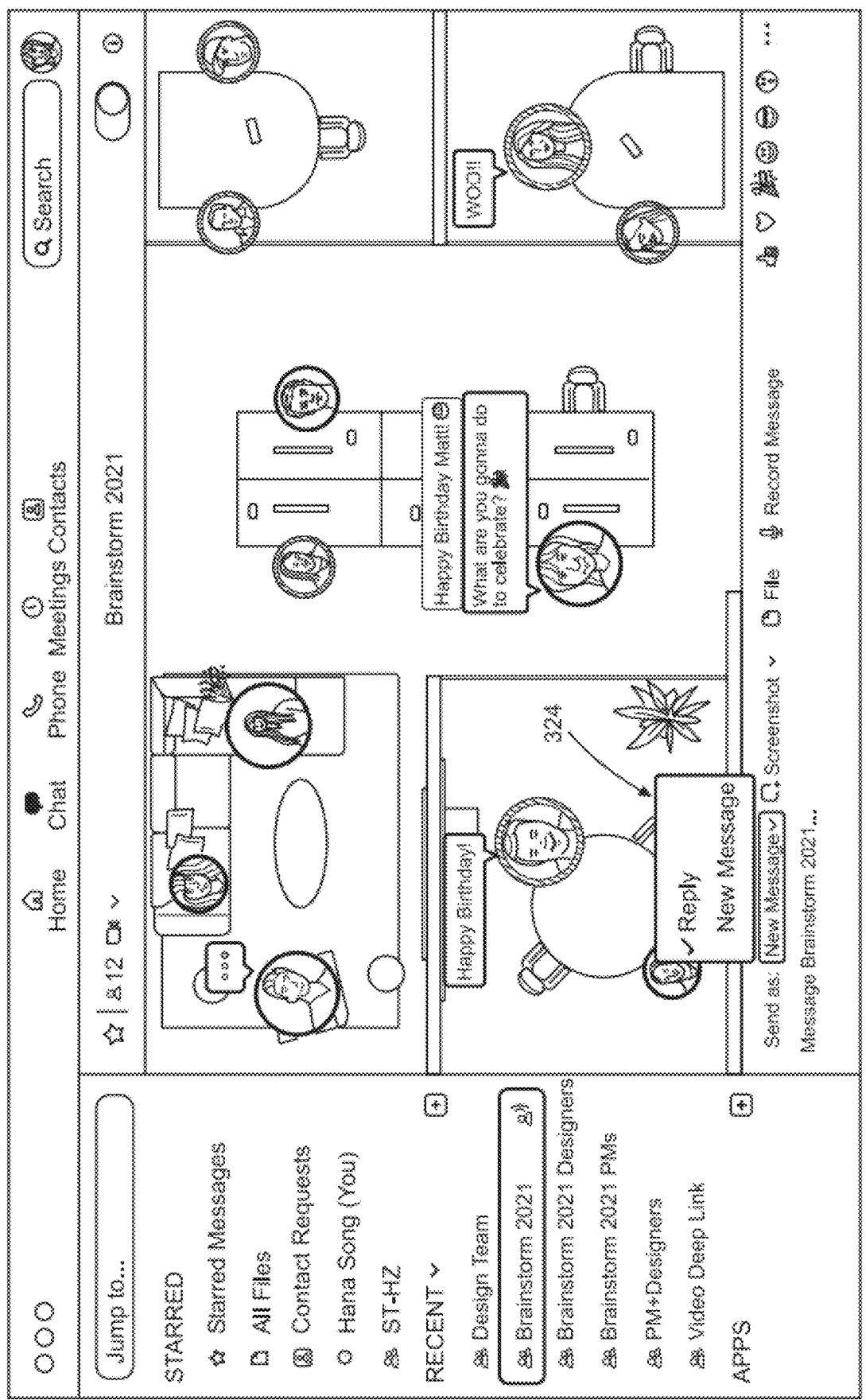
FIG. 3G is a diagram illustrating one example embodiment of selecting a message type to be sent, according to some embodiments.

FIG. 3G is a diagram illustrating one example embodiment of selecting a message type to be sent, according to some embodiments.

The participant from the previous examples has interacted with the message composing component to select a message type to be sent. The participant can select between a reply message, or a new message.

Figure 3H:
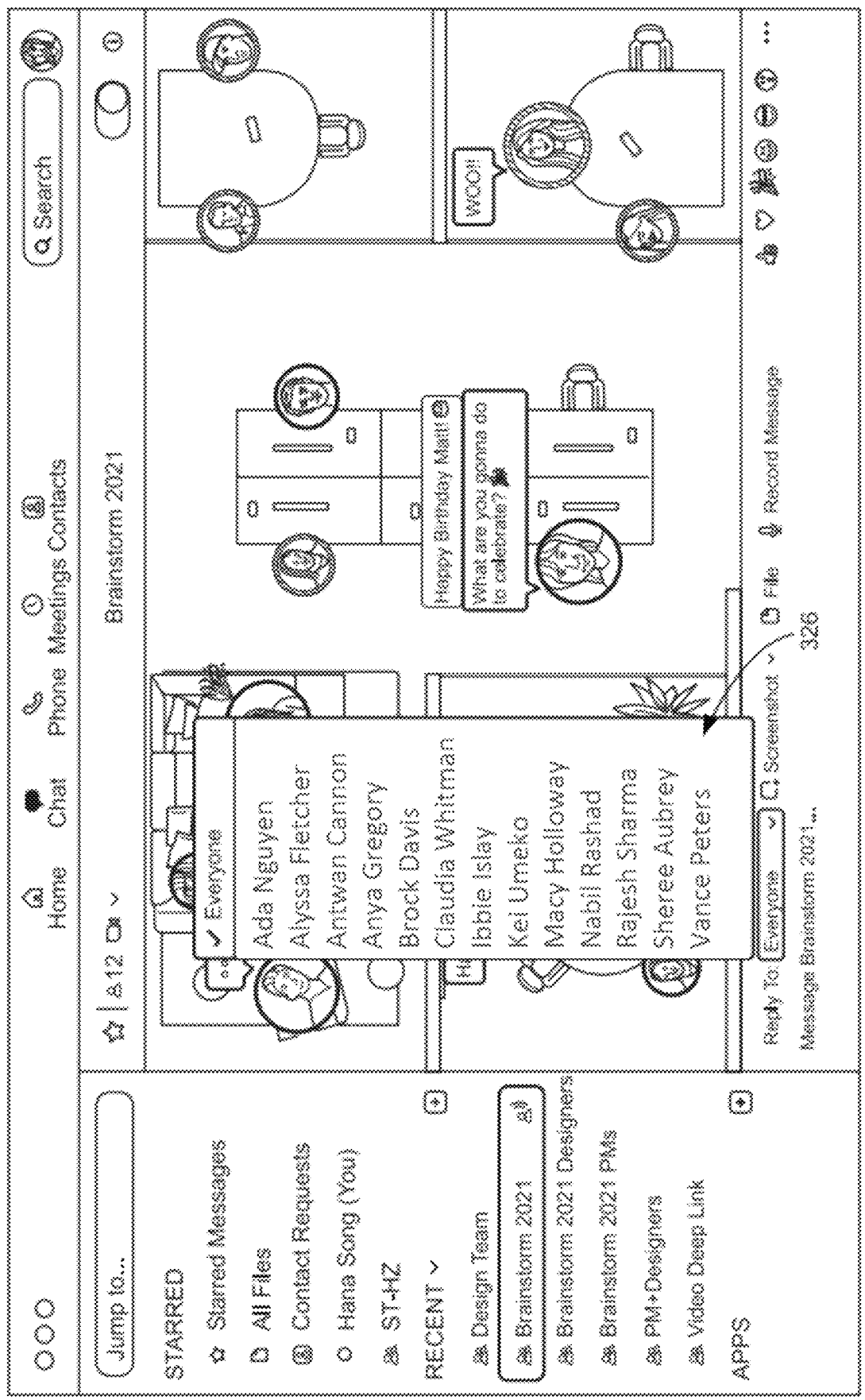
FIG. 3H is a diagram illustrating one example embodiment of selecting recipients for a reply message to be sent, according to some embodiments.

FIG. 3H is a diagram illustrating one example embodiment of selecting recipients for a reply message to be sent, according to some embodiments.

Here, the participant from FIG. 3G has selected a reply message, and a list of potential recipients is displayed. The participant can select a recipient to send a reply message to, or simply reply to everyone. If the participant selects a recipient to reply to, in some embodiments, a visual or textual mark may be indicated to show that a particular participant is being replied to. That participant may also receive a notification of some form within the chat platform, if the participant has permitted such a notification within the participant's settings and chat configuration.

Figure 4A:
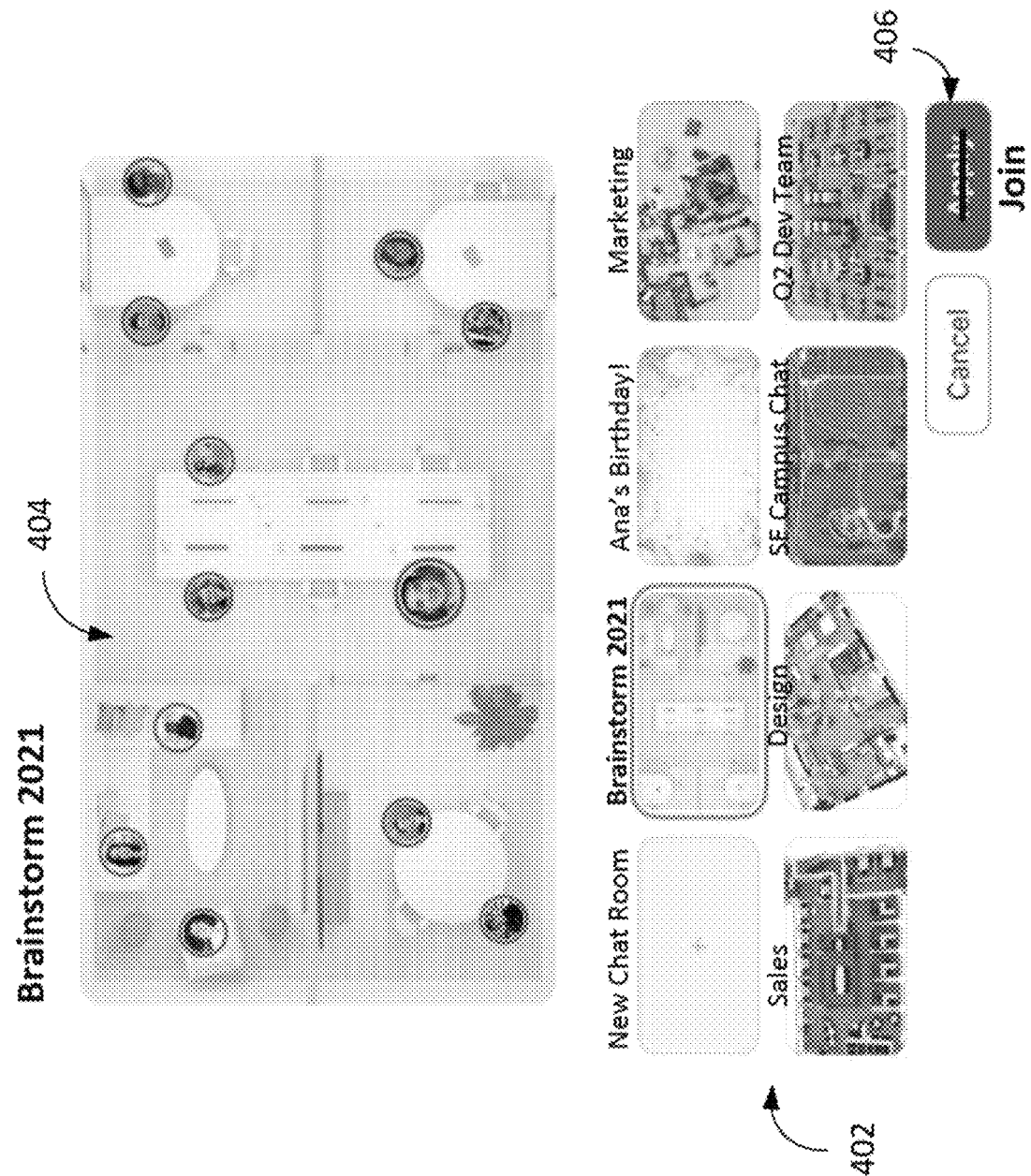
FIG. 4A is a diagram illustrating one example embodiment of a spatial chat dashboard UI, according to some embodiments.

FIG. 4A is a diagram illustrating one example embodiment of a spatial chat dashboard UI, according to some embodiments. A dashboard UI is illustrated, with a number of spatial chat rooms 402 being depicted. In the example embodiment, a prespecified, default dashboard virtual UI is shown, which constitutes a solid white background. Each of the depicted spatial chat rooms shows a virtual background which has been prespecified for the spatial chat room. One of the spatial chat rooms has been engaged or interacted with by the user, which pulls up a larger view 404 for that spatial chat room. The larger view depicts the virtual dashboard for the spatial chat session within that spatial chat room. This larger view also shows spatialized avatars positioned throughout the virtual background of the spatial chat session. Two buttons at the bottom of the dashboard UI depict a "Cancel" button to leave the dashboard UI and return to an earlier navigation UI, and a "Join" button which switches the dashboard UI with a spatial chat UI consisting of the selected spatial chat room. In this case, if the user presses the "Join" button, the user joins the selected "Brainstorm 2021" chat session by seeing the spatial chat UI for that chat session.

Figure 4B:
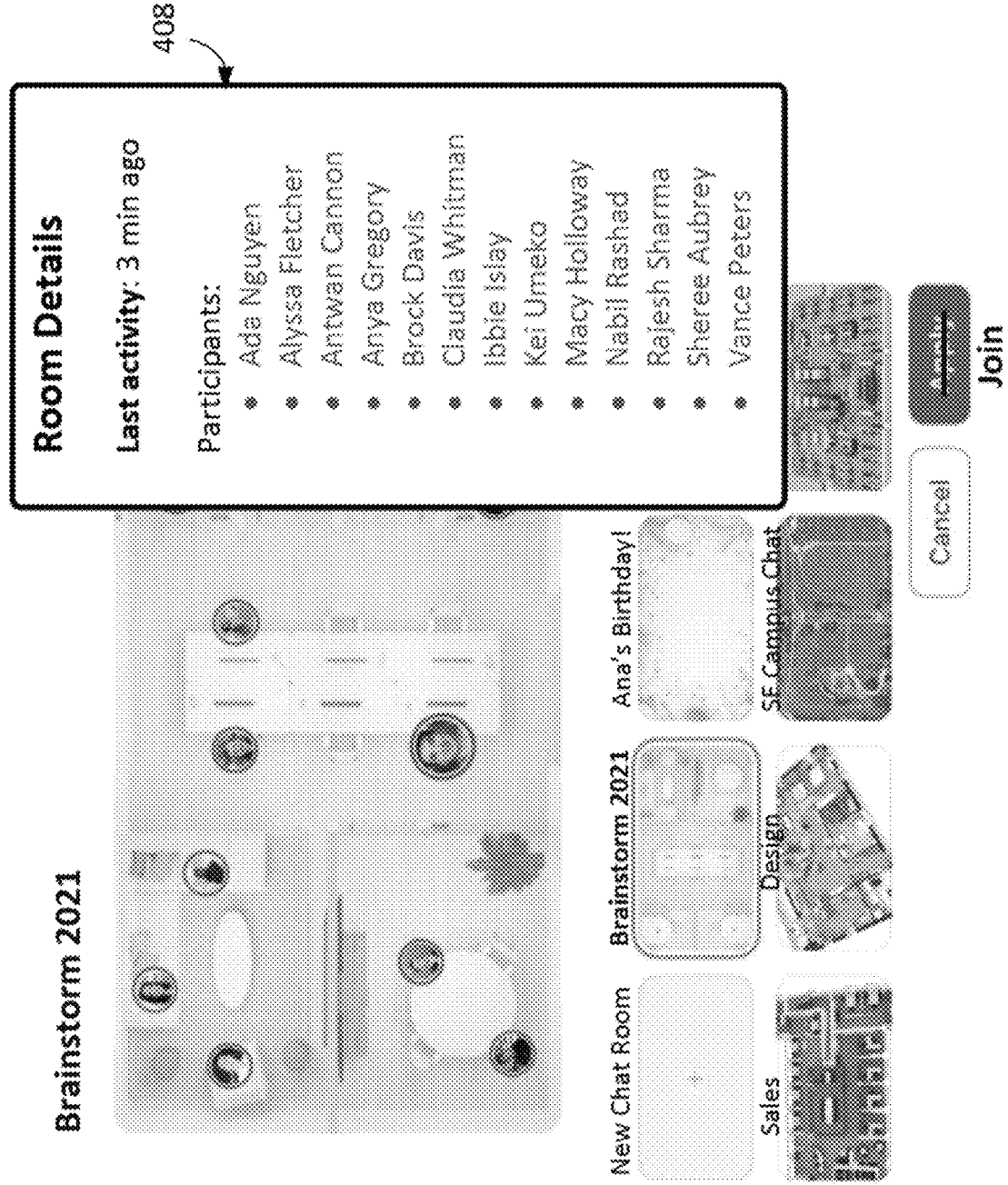
FIG. 4B is a diagram illustrating one example embodiment of a spatial chat dashboard UI with room details displayed, according to some embodiments.

FIG. 4B is a diagram illustrating one example embodiment of a spatial chat dashboard UI with room details displayed, according to some embodiments. The illustrated example of FIG. 4A is shown, and the user has engaged or interacted with the larger "Brainstorm 2021" view within the dashboard UI. For example, the user may have hovered over the larger virtual background, or clicked on the larger virtual background. A "Room Details" window 408 has appeared in response, which shows a number of details for the spatial chat session within that spatial chat room. In the illustrated example, the details include how long ago the last activity within the chat session occurred, and a list of participants within that chat session.

Figure 5:
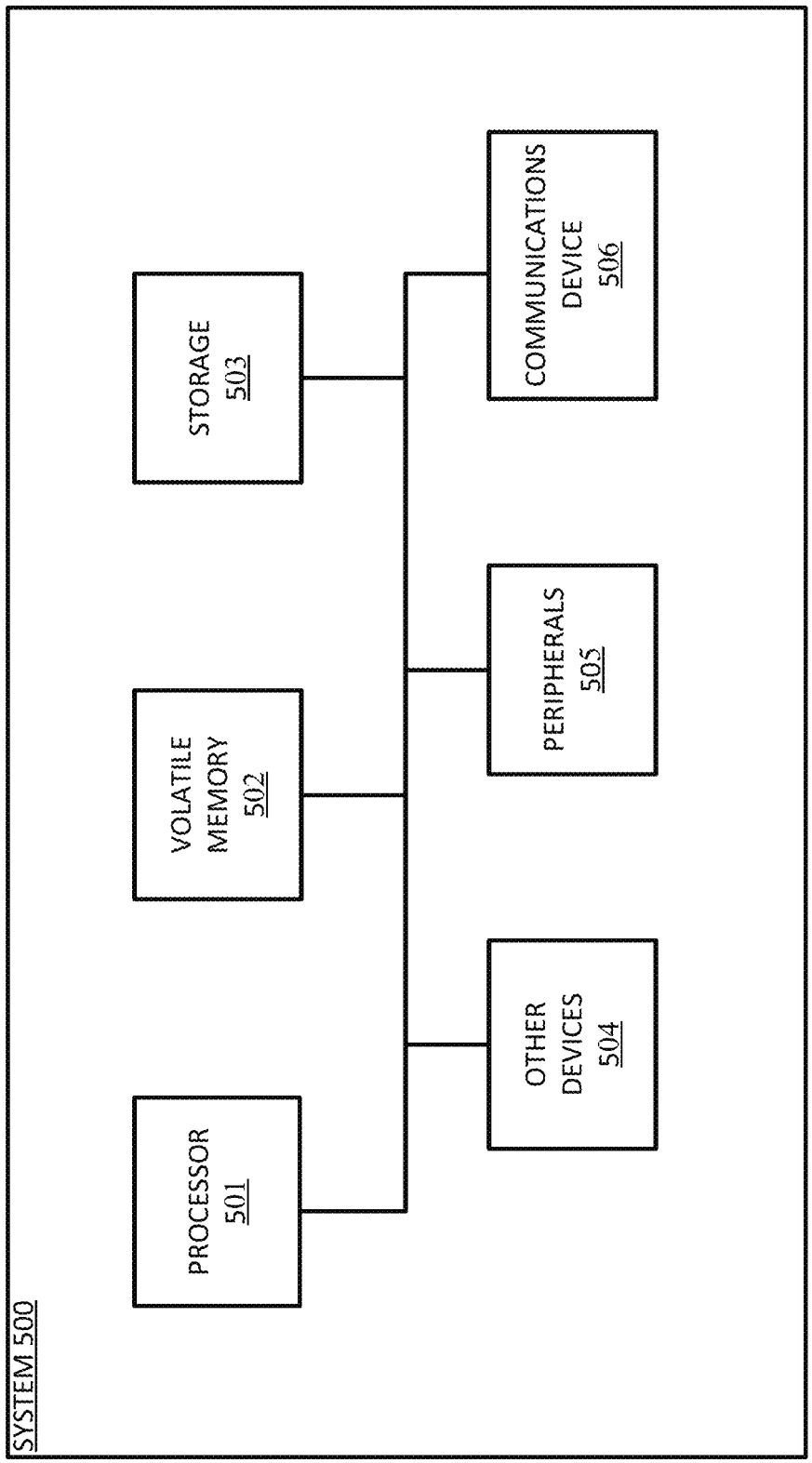
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing a spatial chat view dashboard, comprising:
 displaying, at a client device, a dashboard user interface (UI) for a messaging platform, the dashboard UI comprising:
   a dashboard virtual background, and
   one or more spatial chat rooms, each of the spatial chat rooms is a spatial representation of a chat session associated with a plurality of participants,
   the dashboard UI being configured to display for each of the one or more spatial chat rooms, a listing of names of the plurality of participants for a respective spatial chat room;
 receiving, from the client device, a selection of a spatial chat room from the one or more spatial chat rooms; and
 displaying a spatial chat UI comprising:

the selected spatial chat room comprising a depiction of one or more virtual rooms;
a messaging user interface portion comprising:
a messaging area configured to receive and display messages for the chat session associated with the plurality of participants, the messaging user interface configured to send a message to an individual participant or to all of the plurality of participants; and
one or more spatial avatars displayed within the spatial chat room, each of the spatial avatars representing one of the plurality of participants being depicted with a face representing a respective participant.

2. The method of claim 1, wherein the dashboard UI further comprises an activity status for each of the spatial chat rooms.

3. The method of claim 1, further comprising:
receiving metadata about one or more of the spatial chat rooms; and
displaying a subset of the metadata about the one or more spatial chat rooms in the dashboard UI.

4. The method of claim 3, wherein the displaying the subset of the metadata about the one or more spatial chat rooms in the dashboard UI is performed in response to receiving user input from the client device with respect to at least one spatial chat room.

5. The method of claim 1, wherein the spatial chat rooms are positioned within the dashboard virtual background according to most recent visited chat room.

6. The method of claim 1, wherein the spatial chat rooms are positioned within the dashboard virtual background according to highest chat activity.

7. The method of claim 1, wherein the spatial chat rooms are positioned within the dashboard virtual background according to a customized user selection.

8. The method of claim 1, further comprising:
receiving, from the client device, an input to toggle between the dashboard UI and a previously selected chat room.

9. The method of claim 1, further comprising:
receiving, from the client device, an input to toggle between the dashboard UI and the currently selected chat room.

10. The method of claim 1, wherein the spatial chat UI for the selected spatial chat room further comprises a virtual background and one or more spatial chat avatars overlaid on the virtual background.

11. The method of claim 1, further comprising:
displaying a visual notification of one or more new messages received in at least one of the spatial chat rooms.

12. A communication system comprising one or more processors configured to perform the operations of:
displaying, at a client device, a dashboard user interface (UI) for a messaging platform, the dashboard UI comprising:
displaying, at a client device, a dashboard user interface (UI) for a messaging platform, the dashboard UI comprising:
a dashboard virtual background, and
one or more spatial chat rooms, each of the spatial chat rooms is a spatial representation of a chat session associated with a plurality of participants,
the dashboard UI being configured to display for each of the one or more spatial chat rooms, a listing of names of the plurality of participants for a respective spatial chat room;
receiving, from the client device, a selection of a spatial chat room from the one or more spatial chat rooms; and
displaying a spatial chat UI comprising:
the selected spatial chat room comprising a depiction of one or more virtual rooms;
a messaging user interface portion comprising:
a messaging area configured to receive and display messages for the chat session associated with the plurality of participants, the messaging user interface configured to send a message to an individual participant or to all of the plurality of participants; and
one or more spatial avatars displayed within the spatial chat room, each of the spatial avatars representing one of the plurality of participants being depicted with a face representing a respective participant.

13. The communication system of claim 12, wherein the dashboard UI further comprises an activity status for each of the spatial chat rooms.

14. The communication system of claim 12, further comprising:
receiving metadata about one or more of the spatial chat rooms; and
displaying a subset of the metadata about the one or more spatial chat rooms in the dashboard UI.

15. The communication system of claim 12, wherein the spatial chat rooms are positioned within the dashboard virtual background according to most recent visited chat room.

16. The communication system of claim 12, wherein the spatial chat rooms are positioned within the dashboard virtual background according to highest chat activity.

17. The communication system of claim 12, wherein the spatial chat rooms are positioned within the dashboard virtual background according to a customized user selection.

18. The communication system of claim 12, further comprising:
displaying a visual notification of one or more new messages received in at least one of the spatial chat rooms.

19. A non-transitory computer-readable medium containing instructions for providing a spatial chat view dashboard, comprising:
instructions for displaying, at a client device, a dashboard user interface (UI) for a messaging platform, the dashboard UI comprising:
a dashboard virtual background, and
one or more spatial chat rooms, each of the spatial chat rooms is a spatial representation of a chat session associated with a plurality of participants,
the dashboard UI being configured to display for each of the one or more spatial chat rooms, a listing of names of the plurality of participants for a respective spatial chat room;
instructions for receiving, from the client device, a selection of a spatial chat room from the one or more spatial chat rooms; and
instructions for displaying a spatial chat UI comprising:
the selected spatial chat room;
a messaging user interface portion comprising a depiction of one or more virtual rooms;
a messaging area configured to receive and display messages for the chat session associated with the plurality of participants, the messaging user interface configured to send a message to an individual participant or to all of the plurality of participants; and one or more spatial avatars displayed within the spatial chat room, each of the spatial avatars representing one of the plurality of participants being depicted with a face representing a respective participant.

* * * * *